United States Patent [19]

Rabideau

[11] Patent Number: 5,303,497
[45] Date of Patent: Apr. 19, 1994

[54] FLOATING IMPELLER LURE APPARATUS AND METHOD

[76] Inventor: Phillip A. Rabideau, 3605 Fawn Creek, Austin, Tex. 78746

[21] Appl. No.: 18,342

[22] Filed: Feb. 16, 1993

Related U.S. Application Data

[63] Continuation of Ser. No. 828,304, Jan. 30, 1992, abandoned.

[51] Int. Cl.$^5$ .............................................. A01K 85/00
[52] U.S. Cl. .................... 43/42.21; 43/42.19; 43/42.53; 43/42.28
[58] Field of Search .................. 43/42.16, 42.19, 42.2, 43/42.21, 42.24, 42.28, 42.53

[56] References Cited

U.S. PATENT DOCUMENTS

| | | | |
|---|---|---|---|
| D. 175,545 | 9/1955 | Haynes | 43/42.16 |
| D. 192,223 | 2/1962 | Huntley | 43/42.21 |
| 973,479 | 10/1910 | Cooper | 43/42.24 |
| 1,222,774 | 4/1917 | Leonard | 43/42.19 |
| 1,772,250 | 8/1930 | Hagen | 43/42.28 |
| 1,820,887 | 8/1931 | Pflueger | 43/42.2 |
| 2,199,001 | 4/1940 | Khoenle | 43/42.28 |
| 2,306,692 | 12/1942 | Flood | 43/42.21 |
| 2,551,127 | 5/1951 | Hesse | 43/42.2 |
| 2,619,761 | 12/1952 | Homa | 43/42.19 |
| 3,020,668 | 2/1962 | O'Neil | 43/42.16 |
| 3,374,569 | 3/1968 | Kurlovich | 43/42.46 |
| 3,494,063 | 2/1970 | Treaster | 43/42.21 |
| 3,943,651 | 3/1976 | Erving | 43/42.19 |
| 4,703,579 | 11/1987 | Kay | 43/42.19 |

FOREIGN PATENT DOCUMENTS

| 601762 | 7/1960 | Canada | 43/42.46 |
|---|---|---|---|
| 1101158 | 10/1955 | France | 43/42.19 |

Primary Examiner—Kurt C. Rowan
Attorney, Agent, or Firm—Shaffer & Culbertson

[57] ABSTRACT

A floating impeller lure having a buoyant body with integral reaction blades formed therein. In a first embodiment, a countertorque arm is provided for preventing torque from the rapidly rotating buoyant body means being passed through to an attached fishing line. A second preferred embodiment uses the combination of a hook with a weighted shank and a lure dressing to prevent torque from passing to the attached fishing line. An in-line upright hook-trailer dressing is attached to the countertorque arm by means of a swivel in the first embodiment. In one embodiment of the hook-trailer dressing, the hook-trailer dressing itself floats on the surface and helps counteract rotation thereby, in conjunction with the swivel and the bend of the hook and the hook shank acting as a keel, keeping the hook point in the upright position. In another preferred embodiment of the hook-trailer dressing, a more effective swivel is utilized removing the requirement that the hook-trailer dressing resist any rotation whatsoever and it and the hook-shank-bend acting as a keel are enough to keep the hook point in the upright position.

8 Claims, 3 Drawing Sheets

FLOATING IMPELLER LURE APPARATUS AND METHOD

This application is a continuation in part of application Ser. No. 07/828,304, filed on Jan. 30, 1992, now abandoned.

BACKGROUND OF THE INVENTION

This invention relates to a novel floating impeller lure that is easy to cast, will not twist fishing line, and retrieves the hook is the hook up position.

The recreational or sports fisherman has available a wide variety of artificial fish lures that can be employed to attract and catch fish. One common family or lures (or baits) is known as "buzzbaits." A buzzbait, or any "buzzing" impeller or blade type lure, is intended to imitate the thrashing of bait or forage fish on the water's surface as they are chased by predator fish. A buzzbait generally has a metal reaction impeller(s) rotating around a wire shaft with an attached trailing dressed hook. In practice, the buzzbait is retrieved along the surface of the water by the rapid cranking of the reel by the fisherman while keeping the rod tip in an overhead position. The rapid retrieval speed in not only necessary to keep the lure on the surface of the water, but also to cause the high rotational impeller speed that results in thrashing of the surface of the water. This phenomenon is called "buzzing" by most fishermen familiar with the techniques.

All metal buzzbaits with large impellers are very heavy and require lengthy rods and large fast-retrieve reels for casting and retrieving. As is known with prior art buzzbaits, casting with this heavy tackle is a very tiring process because the reel cranking must begin just before the lure hits the water so it will not sink below the water surface. Any malfunction in the process, such as reel backlash, can cause considerable problems because the buzzbait sinks and snags itself on brush, weeds, etc.

Alternative floating top water baits with small impellers abound and are in wide use by fishermen. By nature, however, floating top water baits with small impellers are not effective buzzbaits, even though they are effective top water lures. The reason for this is that only small impellers may be used because only slight amounts of countertorque weighting can be practically built into the small floating top water belt. Also, the hooks are generally attached to the floating body and, consequently, are not readily made snag proof.

In general, the basic problem is that all rotating impellers, due to bearing surface friction, generate torque that causes the lure to tend to rotate axially. Buzzbaits with a large impeller and a large single hook have a tendency to rotate axially, which is usually countered by the lure and hook laying on their side or in some other undesirable position. The rotation of the hook into an undesirable position means that the hook is not riding in an upright position, the position where the point is upstanding and the proper position for a fish to bite it.

The inventor has searched the prior art from as early as 1870, including the following U.S. patents by number: U.S. Pat. No. 104,930 to Chapman; U.S. Pat. No. 574,992 to Hinckley; U.S. Pat. No. 1,943,283 to Beil; U.S. Pat. No. 2,554,049 to Mace; U.S. Pat. No. 2,569,057 to Hinerman; U.S. Pat. No. 2,612,717 to Kuehnel; U.S. Pat. No. 2,804,713 to Johnson; U.S. Pat. No. 2,952,936 to White; and, U.S. Pat. No. 4,416,080 to Morrissette. A drawback to the devices disclosed in these patents is that none of them are capable of preventing line twist; none of them insure that the hook is retrieved in the hook point up position; and none of them combine a buzzbait feature, with a floating lure, with these other desirable advantages. As a result, there is a need in the art for providing a floating impeller lure which is aerodynamically designed to provide minimum air resistance when casting, which buzzes when retrieved and yet does not contribute appreciatively to line twist and which retrieves an attached in-line single hook with the hook in the upstanding position. It, therefore, is an object of the invention to provide a floating impeller lure that functions as a buzzbait, does not appreciatively attribute to line twist, and which insures that the hook will be retrieved with the point in the upright position.

SHORT STATEMENT OF THE INVENTION

Accordingly, the floating impeller lure of the present invention includes a buoyant body with integral reaction blades formed in the buoyant body. Additionally, an axial through-wire connected at the front end to a fishing line with an anterior countertorque arm is provided for preventing rotation from the buoyant body being passed to the fishing line. Additionally, a hook dressed with a trailing member(s) is attached to the countertorque arm at its anterior end and trails, essentially in-line, behind the buoyant body. The buoyant body of the lure is, in a preferred embodiment, formed in an approximate teardrop shape with a leading end and a rounded trailing end. Integral reaction blades are formed in, and extend from, the buoyant body. Also in the preferred embodiment, the buoyant body includes a hole through its longitudinal center within which the combination through-wire/countertorque arm is located. The through-wire/countertorque arm has a front and an anterior end, with the front end formed into an attachment eye in front of the leading end of the buoyant body, and the anterior end angled behind the trailing end of the buoyant body and formed into a second attachment eye. The countertorque arm further includes a thrust bearing formed by a friction reducing washer and bearing bead to minimize the friction that produces rotational torque to the axial through-wire and to the attached fishing line. Importantly, the countertorque arm is angled behind and away from the trailing end of the buoyant body more than 0° and less than 90°.

The trailing dressed hook is connected to the countertorque arm by means of a swivel. The swivel's function is to enable the hook to ride upright, independent of the position of the countertorque arm. A first type of swivel, that is relatively effective in resisting rotational friction, may be used with one type of lure dressing. With this type of swivel, the preferred lure dressing would be of a type that seeks out and tends to lie flat on the surface of the water, it being buoyant itself. The lure dressing helps resist rotation by the fact that it floats and is in a flat position on the surface. Further, an in-line hook with a point, a shank, and a bend in the shank, when drawn through the water, causes the shank and bend to act as a keel which also helps keep the point of the hook in the appropriate upstanding position. Therefore, if a more effective swivel is used to interconnect the lure dressing and hook with the countertorque arm, any suitable lure dressing is useable whether it tends to float on the surface or not.

A second preferred embodiment of the present invention is similar to the first preferred embodiment except that the second embodiment requires neither a countertorque arm nor a swivel between the through-wire and the hook. The second preferred embodiment employs a single hook with a weighted shank portion that works in combination with a lure dressing to produce a keel action. The keel action produced is sufficient to overcome the torque created by the rotation of the buoyant body upon retrieval, to keep the hook in an upright position upon retrieval, and to prevent the lure from twisting the fishing line.

BRIEF DESCRIPTION OF THE DRAWINGS

Other objects, features, and advantages of the present invention will become more fully apparent from the following detailed description of the preferred embodiment, the appended claims and the accompanying drawings in which:

DETAILED DESCRIPTION OF THE PREFERRED EMBODIMENTS

Figure 1A:
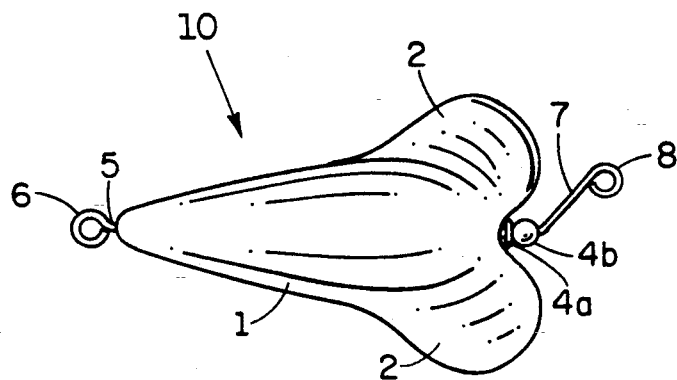
FIG. 1A is a side view of a preferred embodiment of the floating impeller lure of the present invention presented on its broadside.
Figure 1C:
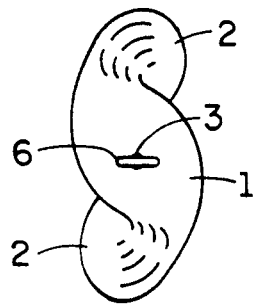
FIGS. 1B, 1C, and 1D are the narrow side, front, and rear view respectively of the floating impeller section of the lure shown in FIG. 1A.
Figure 1D:
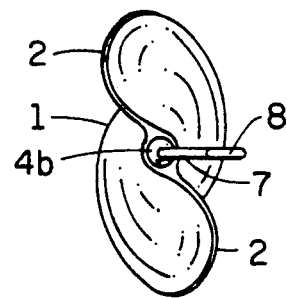
Figure 1B:
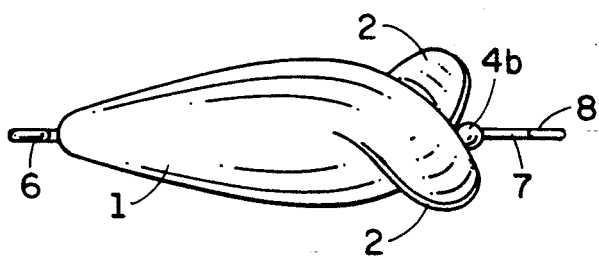

A first preferred embodiment of the present invention is illustrated by way of example in FIGS. 1-4. With specific reference to FIGS. 1A-1D, a floating impeller lure 10 includes an elongated, streamlined body 1 with integral reaction blades 2 formed seamlessly thereon commencing at about the mid point of the body 1 and culminating in large cupped reaction blades 2. The body 1 has a through hole 3 with a washer device 4a concentric to the body. Inserted in the hole 3 is a through wire 5 with a line-attaching eye 6 at the front end and a countertorque arm 7 at the anterior end. At the anterior end of the body 1 between the washer 4a and the arm 7 is a bearing bead 4b. The washer 4a and the bearing bead 4b form a thrust bearing. At the end of the arm 7 is an eye 8 which attached to swivel 9, shown in FIG. 2 and discussed more fully hereafter. Floating impeller lure 10 may be readily made by casting a foaming type plastic, known in the art and not disclosed hereinafter, that is buoyant.

Figure 2:
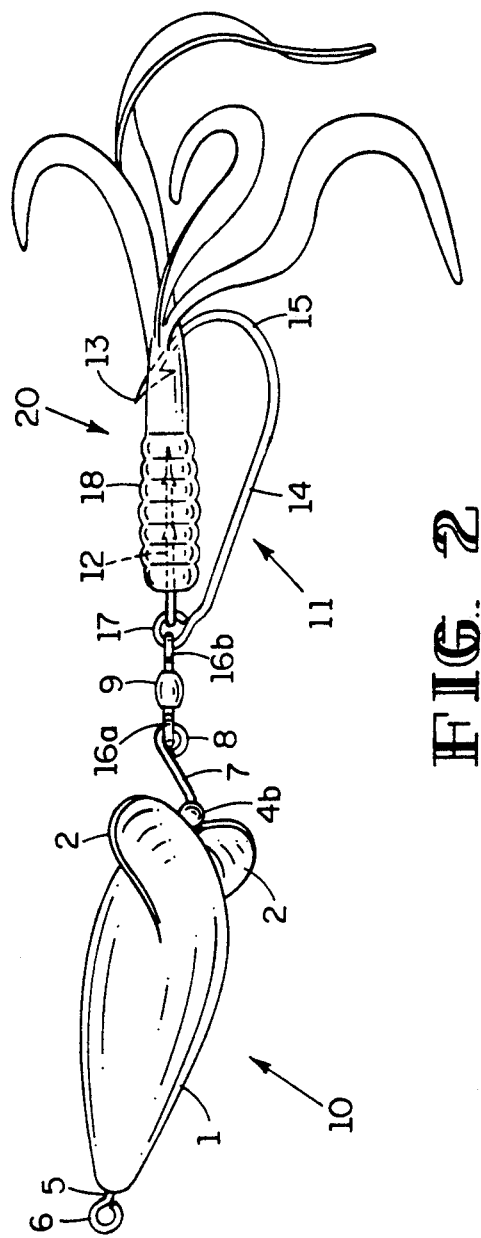
FIG. 2 is a side view of a preferred embodiment of the invention, including a plastic trailer impaled on the bayonet of an in-line hook connected to the countertorque arm by means of a barrel swivel.

Referring not to FIG. 2, floating impeller lure 10 is shown connected to the hook-trailer combination 20 by a swivel 9 thereby comprising the complete impeller lure configuration. Impaled on barbed bayonet 12 and pierced by the hook point 13 of hook 11, is a plastic trailer 18, in this case, a fan-type plastic trailer which is conventionally called a "split-double tail." This type of trailer has the advantage that its undulating members, tails, ride flat on the water surface, resisting rotational torque thereby. Also, the hook shank 14 acts as a keel tending to maintain the hook point 13 in the upright position, the position most suitable for hooking fish. The hook point 13 and bend 15 ride in an upright position due to the factors just mentioned in combination with the action of swivel 9. The swivel 9 allows the trailer 20 to ride with the hook upright, independent of whatever radial position the countertorque arm 7 is in, as illustrated more fully in FIG. 4 hereafter. The point is, there is minimal resistance to rotation within swivel 9 and it is essentially free to rotate, allowing the hook-trailer 20 to seek its natural position with the hook point 13 in the upright position.

In the absence of a countertorque mechanism, an in-line lure with a shaft-mounted rotating impeller will rotate the shaft due to friction. This will twist the attached fishing line, and after a few casts, make the rod and reel inoperable. Even with a swivel added between the line and the lure, line twisting will prevail because no swivel is frictionless, particularly under the heavy line tensions generated with fast lure retrieval such as occurs when buzzing.

The unique anterior countertorque arm 7 in its angled positioned, enables the in-line elongated buoyant hook-trailer shown in FIG. 2, and provides the means to prevent the through wire 5 from continually rotating during lure retrieval and twisting the fishing line (not shown) attached to the eye 6.

Figure 3A:
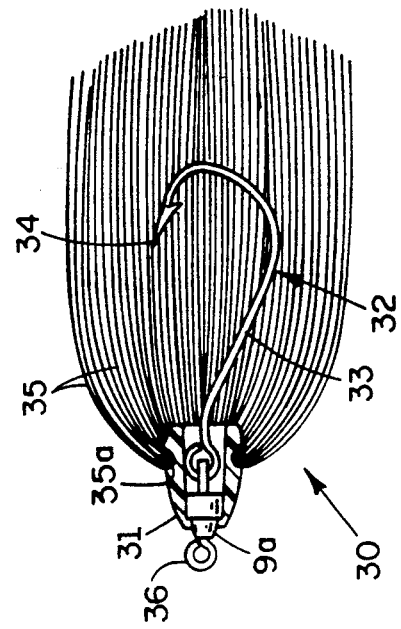
FIG. 3A illustrates an alternative, skirted hook trailer attached to the floating impeller of the invention by a ball bearing type swivel that exhibits minimal resistance to turning.
Figure 3B:
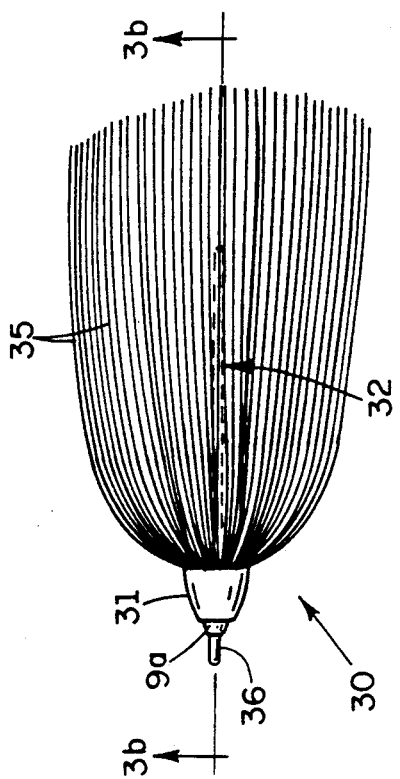
FIG. 3B is a cross-section of FIG. 3A taken along lines 3b—3b of FIG. 3A.

FIGS. 3A and 3B illustrate and alternative hook-trailer section 30. In this case, a ball-bearing swivel 9a is encased in a floating collar 31. A ball-bearing swivel, in particular, exhibits minimum possible rotational friction. These swivels are more expensive but, because of the reduced rotational friction, enable the use of non-flat hook-trailers. The collar 31 can be made of the same floating material, plastic or the like, as the impeller body 1. Hook 32 is coupled to the ball-bearing swivel 9a and with the frame of the swivel, and cemented in the collar 31. The rotatable eye 36 of the swivel 9a attaches to the countertorque arm 7 eye 8. As shown in the partial sectional view in FIG. 3B, a stranded rubber or plastic skirt 35 is affixed to the collar 31 by a tie or rubber constricting ring 35a. Because of the improved performance of ball-bearing swivel 9a which exhibits minimum possible rotational friction, the hook shank 33 and bend 37 act as a keel and the hook point 34 is maintained in the preferred upright position as noted before, without need for a flat-type hook-trailer 20 to contribute to the anti-rotational forces.

Figure 4:
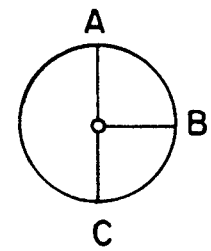
FIG. 4 illustrates some positions of the countertorque arm under various conditions of use.

Referring now to FIG. 4, there are illustrated positions that countertorque are 7 takes during a variety of retrieval methods. FIG. 4 assumes we are looking at floating impeller 10 body 1 from the rear. It is important to remember that in each of these positions, because of swivel 9, or 9a, the attached hook is in the straight up position. Countertorque arm 7 will take up different radial positions depending upon the speed of lure retrieval and, consequently, how much torque is generated at the bearing bead and washer 4a surfaces, and the angle and position of the line relative to the water surface. With slow retrieval speeds and the fisherman maintaining the rod tip in a low position, the countertorque arm rides in position B of FIG. 4. With high retrieval speeds and the rod tip held high over the fisherman's head to keep the front of floating impeller lure pointed upward in a "buzzing" retrieval mode, the countertorque arm rides in position A, as shown in FIG. 4. When the lure is retrieved under water, with the rod tip down, the countertorque arm locates in position C. Once again, in all cases the hook point 13, as shown in FIG. 2, remains in the preferred upright position due to the function of swivel 9a, as in the case of the alternative embodiment of the hook-trailer section 30 shown in FIG. 3A and 3B.

Figure 5:
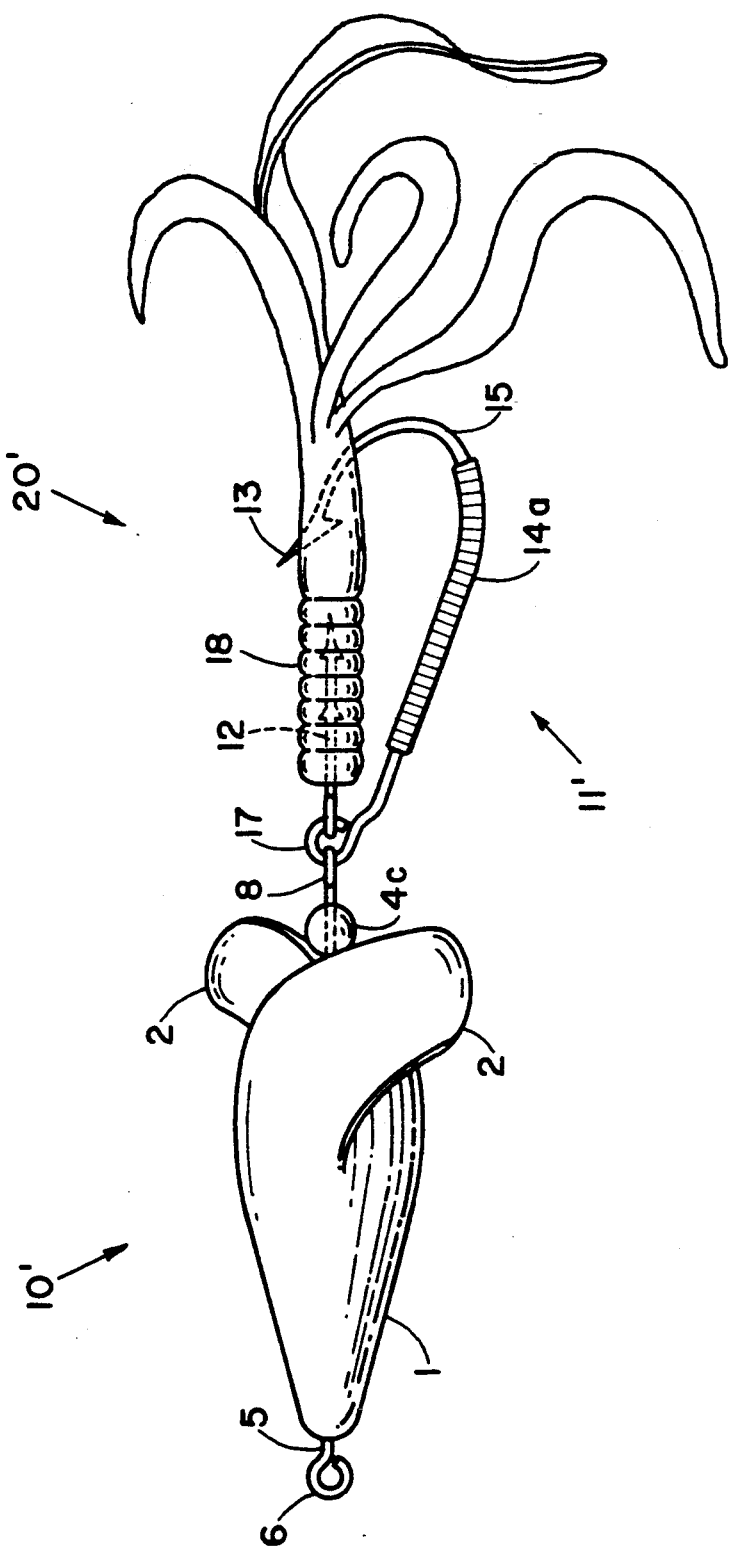
FIG. 5 is a side view of a second preferred embodiment of the invention.

FIG. 5 shows a second preferred embodiment of the principles of the present invention. In this embodiment, a floating impeller lure 10' connects directly to a hook-trailer combination 20' similarly to the first embodiment as shown in FIG. 2. However, this embodiment requires neither a counter-torque arm 7 nor a swivel 9. Instead, this embodiment uses a hook 11' with a weighted shank portion 14a working on combination with a plastic trailer 18 to produce a keel action. With help from a larger bearing bead 4c, the produced keel action prevents the torque produced by the rotating impeller body 1 from causing the combination of the impeller lure and the hook-trailer combination 20' to rotate and twist the attached line as it is retrieved. Such keel action also causes the hook point 13 to remain upright during retrieval.

In operation then, an artificial buzzbait lure is provided that floats, thereby allowing a relaxed form of casting and retrieval. Importantly, the streamlined body 1 of floating impeller lure 10 is formed in an elongated teardrop shape that exhibits minimal air resistance to casting. As a result, the floating impeller lure of the present invention may be cast and recast again and again without fatigue. Further, the floating impeller lure of the present invention allows a great range of retrieving speeds, even including complete stop, which has heretofore not been possible with buzzbaits. Because the impeller lure of the present invention floats, bottom fouling is eliminated. Most importantly, a unique countertorque compensation system keeps the fishing line free of twists and maintains the hook, bend, and point in the preferred upright position. An advantage of the present invention is that it is essentially snag proof due in part to the fact that the hook point is held in the upright position.

While the present invention has been disclosed in connection with the preferred embodiment thereof, it should be understood that there may be other embodiments which fall within the spirit and scope of the invention as defined by the following claims.

I claim:

1. A floating, snag proof, buzzing, fishing impeller lure comprising:
   a) a buoyant body means aerodynamically shaped so that said buoyant body means offers minimum air resistance when cast;
   b) integral reaction blade means formed in said buoyant body means so that said buoyant body means rotates in water when retrieving said cast;
   c) a countertorque means connected to a line and rotatably connected to said buoyant body means so that torque from said rotation is kept from said line;
   d) a trailing lure dressing rotatingly connected to said countertorque means by a swivel means, said trailing lure dressing formed so as to lie flat on the surface of said water so that rotation is resisted; and
   e) an in-line hook with a point, shank, and bend in said shank connected to said trailing lure dressing so that as said cast is retrieved, said bend and shank act as a keel and, in combination with said swivel and said floating lure dressing, keep said point in an upright position and free of snags.

2. A floating, snag proof, impeller fishing lure comprising:
   (a) a buoyant body means of an approximate teardrop shape including a smooth narrow leading end and a rounded trailing end;
   (b) integral reaction blade means formed in said buoyant body means comprising at least one pair of oppositely positioned cupped blades extending from a rounded trailing end of said buoyant body means;
   (c) a countertorque means connected to a fishing line for preventing the transfer of line twisting torque caused by said buoyant body means to said fishing line comprising:
      (i) a through-wire, passing through a hole along the longitudinal axis of said buoyant body means including a leading end formed into a first attachment eye, a center section substantially contained within said buoyant body and partially extending from said trailing end of said buoyant body, a countertorque arm located anteriorly beyond said center section and angled relative to said center section at an angle greater than 0 degrees and less than 90, and an anterior end formed into a second attachment eye;
      (ii) a washer means and a bearing bead means rotatably mounted on said center section of said through-wire between said trailing end of said buoyant body means and said countertorque arm;
      (iii) a swivel means including a first end connected to said second attachment eye;
   (d) a single in-line hook with an eye, a point, a shank, and a bend in said shank, said eye connected to a second of said swivel means so that as said in-line hook is drawn through water, said shank and bend act as a keel; and
   (e) a lure dressing means connected to said eye of said hook for working in combination with said swivel means and said keel action to maintain said point in an upstanding position.

3. The lure of claim 2 wherein said swivel means is effective in accommodating various radial positions of said countertorque arm so that said point is maintained in an upstanding position in combination with said keel action alone.

4. A floating, snag proof, impeller fishing lure comprising:
   (a) a buoyant body means of an approximate teardrop shape including a smooth narrow leading end and a rounded trailing end;
   (b) integral reaction blade means formed in said buoyant body means comprising at least one pair of oppositely positioned cupped blades extending from a rounded trailing end of said buoyant body means;
   (c) a countertorque means connected to a fishing line for preventing the transfer of line twisting torque caused by said buoyant body means to said fishing line comprising:
      (i) a through-wire, passing through a hole along the longitudinal axis of said buoyant body means including a leading end formed into a first attachment eye, a center section substantially contained within said buoyant body and partially extending from said trailing end of said buoyant body, and so anterior end formed into a second attachment eye;

(ii) a washer means and a bearing bead means rotatably mounted on said center section of said through-wire between said trailing end of said buoyant body means and said anterior end of said through-wire;

(d) a single in-line hook with an eye, a point, a weighted shank, and a bend in said shank, said eye connected to said second attachment eye so that as said in-line hook is drawn through water, said weighted shank and bend act as a keel; and (e) a lure dressing means connected to said eye of said hook for working in combination with said keel action to maintain said point in an upstanding position.

5. A floating, snag proof, impeller fishing lure method comprising the steps of:

(a) constructing an aerodynamically shaped buoyant body means so that said buoyant body means offers minimum air resistance when cast;

(b) forming integral reaction blade means in said buoyant body means so that said buoyant body means rotates in water when retrieving said cast;

(c) connecting a countertorque means to a line, the countertorque means being rotatably connected to said buoyant body means so that torque from said rotation of said buoyant body is kept from said line;

(d) rotatably connecting a trailing lure dressing to said countertorque means by a swivel means, said trailing lure dressing formed so as to lie flat on the surface of said water so that rotation is resisted; and (e) connecting an in-line hook with a point, shank, and bend in said shank to said trailing lure dressing so that as said cast is retrieved, said bend and shank act as a keel and, in combination with said swivel means and said lure dressing, keep said point in an upright position and free of snags.

6. A floating impeller lure method comprising the steps of:

(a) constructing a buoyant body means of an approximate teardrop shape including a smooth narrow leading end and a rounded trailing end;

(b) forming integral reaction blade means in said buoyant body means with at least one pair of oppositely positioned cupped blades extending from the rounded trailing end of said buoyant body means;

(c) connecting a countertorque means to a fishing line for preventing the transfer of line twisting torque caused by said buoyant body means to said fishing line including the steps of:

(i) passing a through-wire through a hole along the longitudinal axis of said buoyant body means, forming a leading end of said through-wire into a first attachment eye, containing a center section of said through-wire substantially within said buoyant body, extending a portion of said through-wire from said trailing end of said buoyant body, forming a countertorque arm from said through-wire anteriorly beyond said center section of said through-wire, angling said countertorque arm relative to said center section at an angle greater than 0 degrees and less than 90 relative to said center section, and forming an anterior end of said through-wire into a second attachment eye;

(ii) rotatably mounting a washer means and a bearing bead means on said through-wire between said trailing end of said buoyant body means and said countertorque arm;

(iii) connecting a first end of a swivel means to said second attachment eye;

(d) providing a single in-line hook with an eye, a point, a shank, and a bend in said shank, connecting said eye to a second end of said swivel means so that as said in-line hook is drawn through water, said shank and bend act as a keel; and (e) connecting a lure dressing means to said eye of said hook, said lure dressing means for working in combination with said swivel means and said keel action to maintain said point in an upstanding position.

7. The method of claim 6 further comprising the step of providing a swivel means that is more effective in accommodating various radial positions of said countertorque arm so that said point is maintained in an upstanding position in combination with said keel action alone.

8. A floating, snag proof, impeller fishing lure method comprising the steps of:

(a) constructing a buoyant body means of an approximate teardrop shape including a smooth narrow leading end and a rounded trailing end;

(b) forming integral reaction blade means in said buoyant body means with at least one pair of oppositely positioned cupped blades extending from a rounded trailing end of said teardrop shaped buoyant body;

(c) connecting a countertorque means to a fishing line for preventing the transfer of line twisting torque caused by said buoyant body means to said fishing line including the steps of:

(i) passing a through-wire through a hole along the longitudinal axis of said buoyant body means, forming a leading end of said through-wire into a first attachment eye, containing a center section of said through-wire substantially within said buoyant body, extending a portion of said through-wire from said trailing end of said buoyant body and forming an anterior end of said through-wire into a second attachment eye;

(ii) rotatably mounting a washer means and a bearing bead means on said through-wire between said trailing end of said buoyant body means and said anterior section of said through-wire;

(d) providing a single in-line hook with an eye, a point, a weighted shank, and a bend in said shank, connecting said eye to said second attachment eye so that as said in-line hook is drawn through water, said weighted shank and bend act as a keel; and (e) connecting a lure dressing means to said eye of said hook, said lure dressing means for working in combination with said keel action to maintain said point in an upstanding position.

* * * * *

UNITED STATES PATENT AND TRADEMARK OFFICE
CERTIFICATE OF CORRECTION

PATENT NO. : 5,303,497

DATED : April 19, 1994

INVENTOR(S) : Phillip A. Rabideau

It is certified that error appears in the above-identified patent and that said Letters Patent is hereby corrected as shown below:

In Claim 2, column 6, line 37, of the Patent add the word "end" after the word "second".

In Claim 4, column 7, line 1, of the Patent change "so" to --an--.

Signed and Sealed this

Sixteenth Day of August, 1994

*Attest:*

BRUCE LEHMAN

*Attesting Officer*     *Commissioner of Patents and Trademarks*